United States Patent [19]

Merkel

[11] Patent Number: 5,739,810
[45] Date of Patent: Apr. 14, 1998

[54] COMPUTER INPUT DEVICE AND METHODS OF MANUFACTURING SAME

[75] Inventor: Harold S. Merkel, Houston, Tex.

[73] Assignee: Compaq Computer Corporation, Houston, Tex.

[21] Appl. No.: 517,247

[22] Filed: Aug. 21, 1995

[51] Int. Cl.⁶ .................................................. G09G 5/00
[52] U.S. Cl. ............................ 345/156; 345/168; 361/680
[58] Field of Search ...................................... 345/173, 156, 345/167, 168; 178/18, 19; 361/680, 681

[56] References Cited

U.S. PATENT DOCUMENTS

| | | | |
|---|---|---|---|
| 4,926,010 | 5/1990 | Citron | 346/168 |
| 5,049,863 | 9/1991 | Oka | 345/168 |
| 5,241,303 | 8/1993 | Register et al. | 345/168 |
| 5,268,817 | 12/1993 | Miyagawa et al. | 361/681 |
| 5,382,962 | 1/1995 | Young | 345/167 |

*Primary Examiner*—Kee M. Tung
*Assistant Examiner*—Matthew Luu
*Attorney, Agent, or Firm*—Konneker & Smith

[57] ABSTRACT

A computer input device and method of manufacturing same provides multiple input capabilities without utilizing any more space than is required for a single input device. In a preferred embodiment, an input device housing has a keyboard on a top surface and a digitizer on a bottom surface so that the digitizer input function is available to a user without taking up any additional space on a desktop or in a notebook computer.

20 Claims, 3 Drawing Sheets

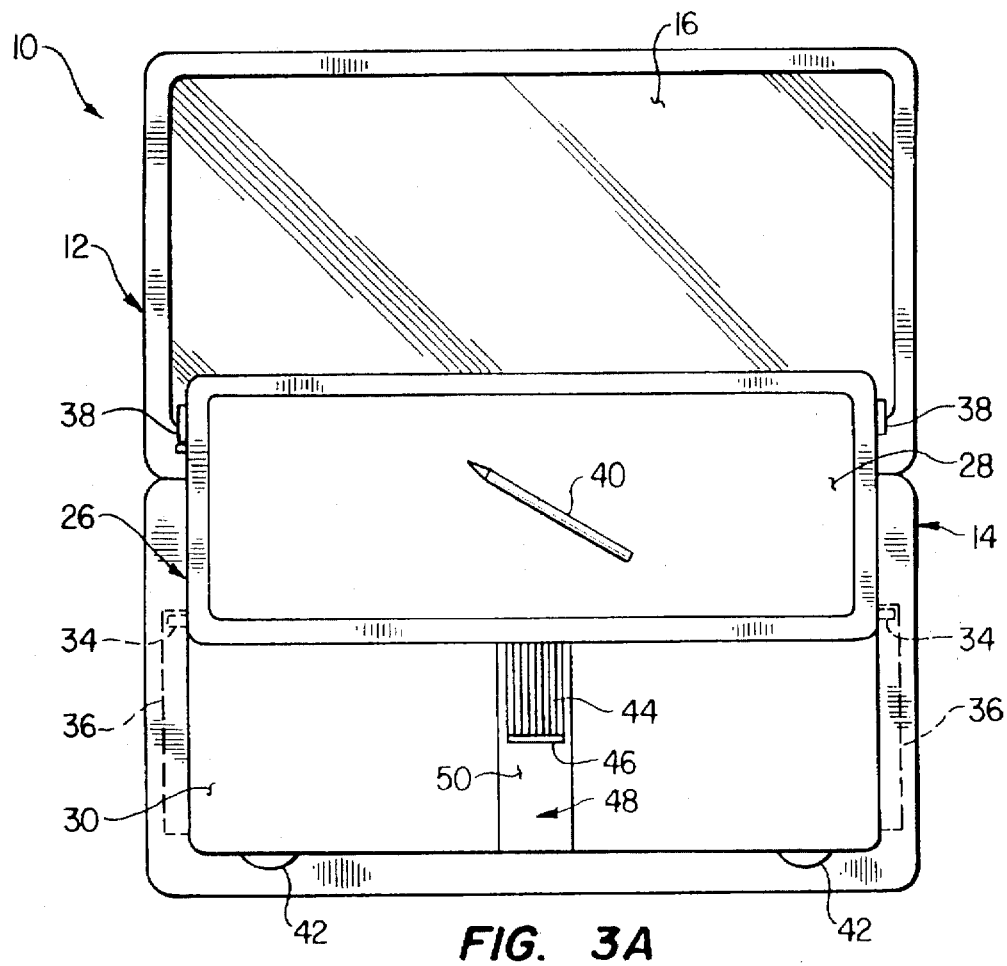
FIG. 3A
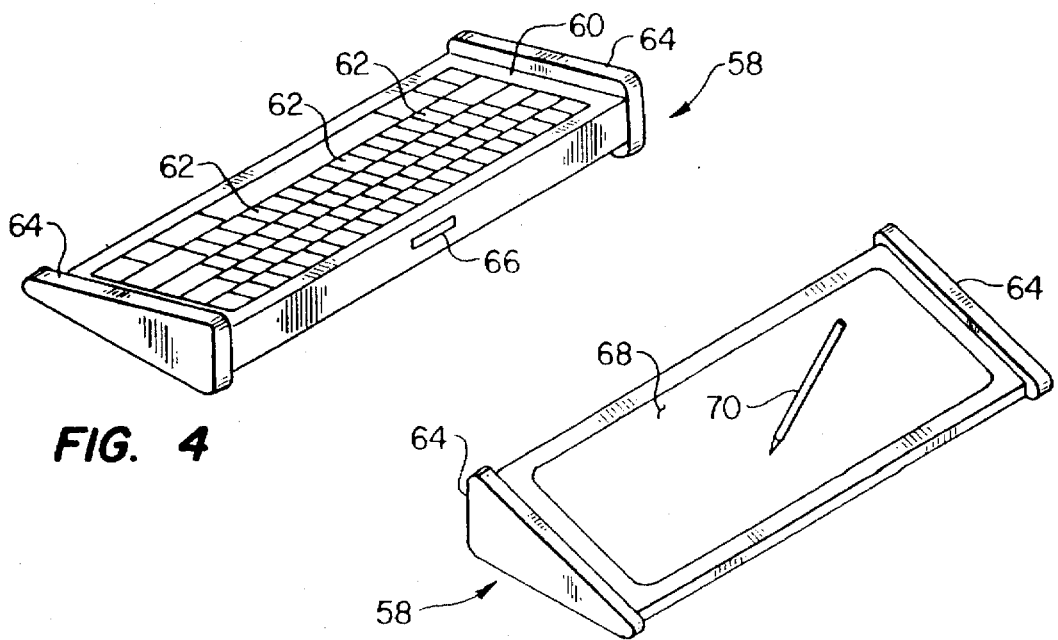
FIG. 4
FIG. 5

COMPUTER INPUT DEVICE AND METHODS OF MANUFACTURING SAME

BACKGROUND OF THE INVENTION

The present invention relates generally to computer input devices and, in a preferred embodiment thereof, more particularly provides a reversible computer input device having a keyboard on one surface and a digitizer on an opposite surface.

In order for a computer to receive instructions from a user, the user must be able to communicate those instructions to the computer. Input devices perform the function of translating user input (for example, text or graphics) so that it may be transmitted to, and received by, the computer. Thus, a text input device may convert a letter into a series of high and low electrical pulses, or a graphics input device may convert a series of cartesian coordinates into another, more complex, series of electrical pulses.

A computer will typically have at least one input device, the most common by far being a keyboard. The keyboard provides a convenient means for entering text and, in most instances, will also provide some rudimentary control of a screen cursor. As computer interfaces have evolved from almost exclusively text-based to increasingly graphics-based, the need for effective graphics input has spawned a variety of graphics input devices, such as the mouse, trackball, digitizer, touch screen, etc.

Of these graphics input devices, the digitizer has unique capabilities especially suited to the modern and probable future uses of computers. For example, computers are now being used to access and control financial assets through electronic fund transfers and, for security purposes, a digitizer is the only convenient means now available for a person to input their signature. Additionally, great strides are being made in computerized handwriting recognition so that text may be input by writing on a digitizer rather than by typing on a keyboard.

Unfortunately, to be of maximum benefit, a digitizer takes up a large area. Where a user has a large surface, such as a desk, on which to place a computer housing, screen, keyboard, etc., the addition of a digitizer as a separate accessory may or may not present a problem. Where, however, the user has only a small area in which to place a computer and its accessories, or is using a portable computer, such as a "notebook" computer, there may be no surface available for another accessory such as a digitizer.

One solution, utilized by several computer manufacturers, has been to incorporate the digitizer into the computer screen. In that way, the digitizer takes up no additional surface area. This solution has been somewhat successful in the notebook computer market where the computer screen may at times be tilted back onto a relatively flat support, such as the user's lap, so that the user can write on the screen surface. It is, however, quite awkward in practice.

Another disadvantage of the screen/digitizer solution is that the screen is obscured when the user is writing on it. Many computer applications require that the screen remain unobscured during input so that the user may see error messages, warnings, etc. that a computer program communicates to the screen.

Furthermore, the writing surface (the computer screen) is typically hard and does not provide the resistance to pen movement that people are familiar with when writing. Thus, the resulting handwriting tends to be clumsy and jagged. This is unacceptable when the handwriting must be converted to text or when it is used to confirm the user's identity (e.g., as a signature).

Another solution, currently utilized in the APPLE POWERBOOK notebook computers, is to incorporate a small digitizer adjacent the keyboard. This small digitizer is useable for cursor control, but it does not have the surface area needed nor the capability for handwriting capture. It also takes up space on the surface of the computer which could be used for other functions.

From the foregoing, it can be seen that it would be quite desirable to provide a computer input device which does not utilize or block the computer screen, allows both textual and graphical input, and requires no more surface area than a computer keyboard. It is accordingly an object of the present invention to provide such a computer input device and methods of manufacturing same.

SUMMARY OF THE INVENTION

In carrying out the principles of the present invention, in accordance with an embodiment thereof, a computer input device is provided which is a reversible keyboard/digitizer, utilization of which does not block the computer screen, allows both textual and graphical input, and takes up no more surface area than a conventional computer keyboard.

In broad terms, a computer input device is provided which includes an input device housing having top and bottom side surfaces, a first input means (representatively a keyboard) mounted to the input device housing top side surface, a second input means (representatively a digitizer) mounted to the input device housing bottom side surface, and means for transmitting the input from the first and second input means to the computer, whereby the user selects from among the first and second input means mounted to the input device housing for communicating input to the computer.

A method of manufacturing a computer is also provided, which method includes the steps of providing an input device housing having top and bottom side surfaces, mounting a first input means to the input device housing top side surface, mounting a second input means to the input device housing bottom side surface, and providing means for transmitting the input from the first and second input means to the computer.

The use of the disclosed computer input device adds little to the manufacturing cost of the computer, allows use of the digitizer and computer screen simultaneously, takes up no more surface area than a conventional keyboard, and provides a relatively large surface area digitizer on which to write. It may be offered as a computer accessory to take the place of a standard keyboard, or it may be built into a computer housing, as with the disclosed notebook computer.

BRIEF DESCRIPTION OF THE DRAWINGS

FIG. 3a is a view similar to that in FIG. 1, but with a keyboard portion of the computer being turned to reveal a digitizer operatively disposed on its underside;

FIG. 4 is an isometric view of a separate computer input device embodying principles of the present invention and being disposed in a keyboard orientation thereof; and FIG. 5 is an isometric view of the computer input device of FIG. 4 in a digitizer orientation thereof.

DETAILED DESCRIPTION

Figure 1:
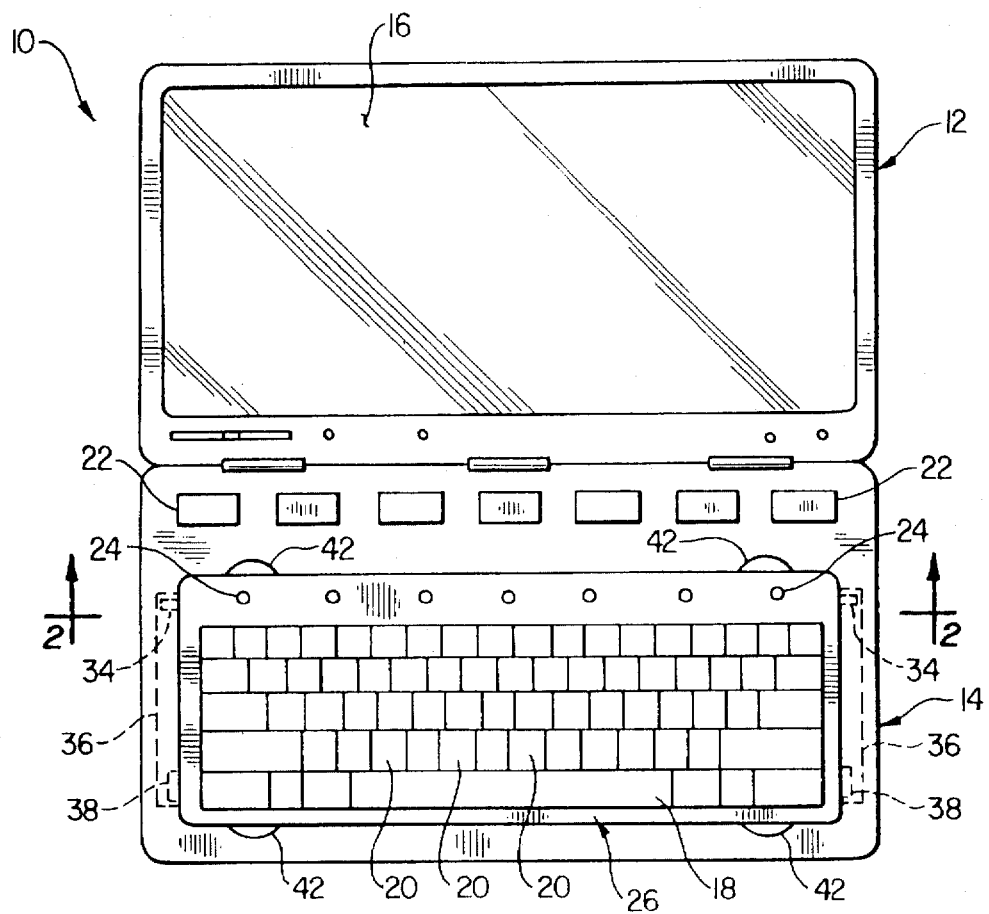
FIG. 1 is a top plan view, in its fully opened configuration, of a notebook computer embodying principles of the present invention.

Illustrated in FIG. 1 is a notebook computer 10 which embodies principles of the present invention. It is shown in an opened and flat position for illustrative clarity, with the upper portion 12 folded completely back so that it is coplanar with the lower portion 14. In this position, both the screen 16 located in the upper portion 12, and the keyboard 18 located in the lower portion 14 are readily visible.

Although the configuration illustrated in FIG. 1, with the screen 16 in the upper portion 12, and the keyboard 18 in the lower portion 14, of a notebook computer 10 is typical for modern notebook computers, it is to be understood that the principles of the present invention may be embodied in other configurations. For example, the screen 16 may be detachable from the computer 10. As another example, there may be only one computer portion, as with a hand-held computer.

The representatively illustrated keyboard 18 is conventional, suited for input of text, such as letters, numbers, and symbols, by typing on keys 20, and is typically used in conjunction with a computer program which requires textual input, such as a word processing or database program. The keyboard 18 may also have directional cursor control keys for positioning a cursor on the screen 16. Surrounding the keyboard 18 in the lower portion 14 may be other keys 22 and indicator lights 24, and other input devices, such as a joystick.

The keyboard 18 is located on one surface of a reversible input device housing 26 (representatively, its top side surface). On the opposite surface (i.e., the bottom side surface of housing 26) is another input device, representatively illustrated as a digitizer 28 (FIG. 3a). The digitizer 28 uniquely takes advantage of the typically unused bottom surface of the housing containing the keyboard 18, here the reversible input device housing 26. It is to be understood that any other input device that could take advantage of the bottom surface of the reversible input device housing 26, such as a scanner, could be substituted in place of the digitizer 28 without departing from the principles of the present invention.

Figure 2:
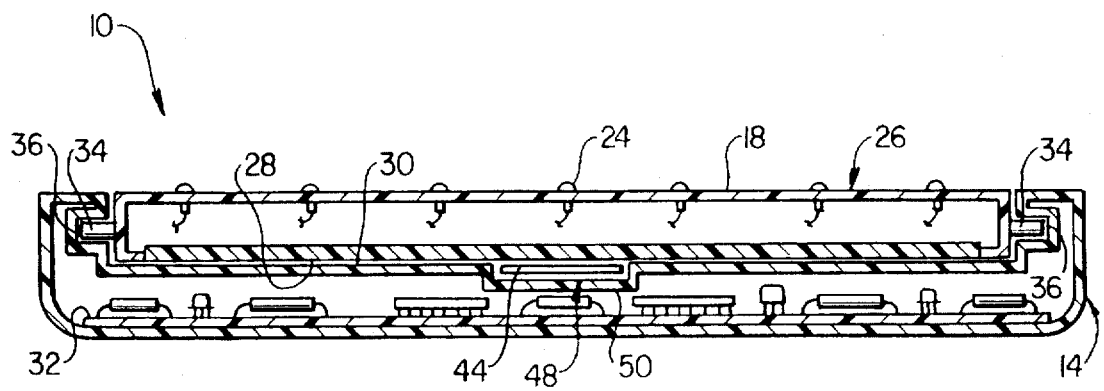
FIG. 2 is an enlarged scale cross-sectional view through the computer, taken along line 2—2 of FIG. 1.

Turning now to FIG. 2, it can be seen that the reversible input device housing 26 is carried in a recess 30 within the top side of the lower portion 14 of the notebook computer 10. Beneath the recess 30, in the interior of the lower portion 14, is a printed circuit board 32 representatively illustrated with various electrical and electronic components mounted thereon as an example of a portion of the computer 10 with which the input devices mounted on the reversible input device housing 26 communicate.

Pins 34 on opposite ends of the reversible input device housing 26 and adjacent the rear side thereof, secure the rear side of the reversible input device housing 26 in the recess 30. The pins 34 extend into slots 36 located in opposite sides of the recess 30 in the computer 10. The slots 36 allow the pins 34 (and thus the rear side of the reversible input device housing 26) to slide horizontally in the recess 30 (i.e., vertically as viewed in FIGS. 1 and 3), without permitting complete removal of the housing 26 from the recess 30.

Resilient snap members 38 (see FIG. 3a), mounted on opposite ends of the reversible input device housing 26 and adjacent the front side thereof, releasably secure the front side of housing 26 in the recess 30. When snapped into position, the snap members 38 extend into the slots 36 and prevent the front side of housing 26 from inadvertently dislodging from the recess 30.

Thus, the rear side of housing 26 is secured in the recess 30 at its rear side by the pins 34 which extend into the slots 36, and the front side of housing 26 is releasably secured in the recess 30 at its front side by the snap members 38 which resiliently extend into slots 36. Pins 34 also serve as pivot points about which the housing 26 rotates when snap members 38 are released from slots 36.

Turning now to FIG. 3a, the reversible input device housing 26 is representatively illustrated in a raised position with the snap members 38 released from slots 36. Compared to FIG. 1, the housing 26 is rotated upward about its pins 34 in slots 36. In this view, the digitizer 28, on the underside of housing 26, is clearly visible.

To position the digitizer 28 for use with pen 40, the user merely slides the rear side of the now upwardly pivoted housing 26 forwardly by sliding pins 34 laterally forwardly in slots 36 (i.e., downwardly as viewed in FIG. 3a), rotates the housing 26 toward the recess 30, and then engages snap members 38 in rear end portions of slots 36. Finger holes 42 are provided at the front and rear sides of recess 30 so that the user can lift the housing 26 front side out of the recess 30 to release snap members 38 from slots 36.

A flexible printed circuit (FPC) 44 provides electrical communication between the input devices mounted on housing 26 and the printed circuit board 32. The FPC 44 extends from generally the center of the rear side of the housing 26 to a connector 46 mounted generally in the center of the recess 30 in a trough 48. The trough 48 permits the housing 26 to lie flat in the recess 30 with the FPC 44 beneath it. Thus, as illustrated in this embodiment, the FPC 44 will lie flat in a front end portion 50 of the trough 48 when the housing 26 is positioned in recess 30 for use of the digitizer 28, and will lie flat in a rear end portion of the trough 48 when the housing 26 is positioned in recess 30 for use of the keyboard 18.

In place of the FPC 44 and connector 46, alternate methods of communicating from the devices mounted on the housing 26 to the printed circuit board 32 include an infrared transmitter mounted in one end of the housing 26 and an infrared receiver mounted in the corresponding end of the recess 30, a radio frequency transmitter mounted in the housing 26 and a receiver mounted in the lower portion 14 of the computer 10, and other communication means known to those skilled in the art.

Although elements such as pins 34, slots 36, snap members 38, and finger holes 42 have been disclosed in FIGS. 1 through 3a in particular positions relative to the housing 26, lower portion 14, and recess 30, it is to be understood that these elements and positions, as well as others, are representatively illustrated, and that other elements known to those skilled in the art may be utilized in place of the disclosed elements without deviating from the principles of the present invention.

Figure 3B:
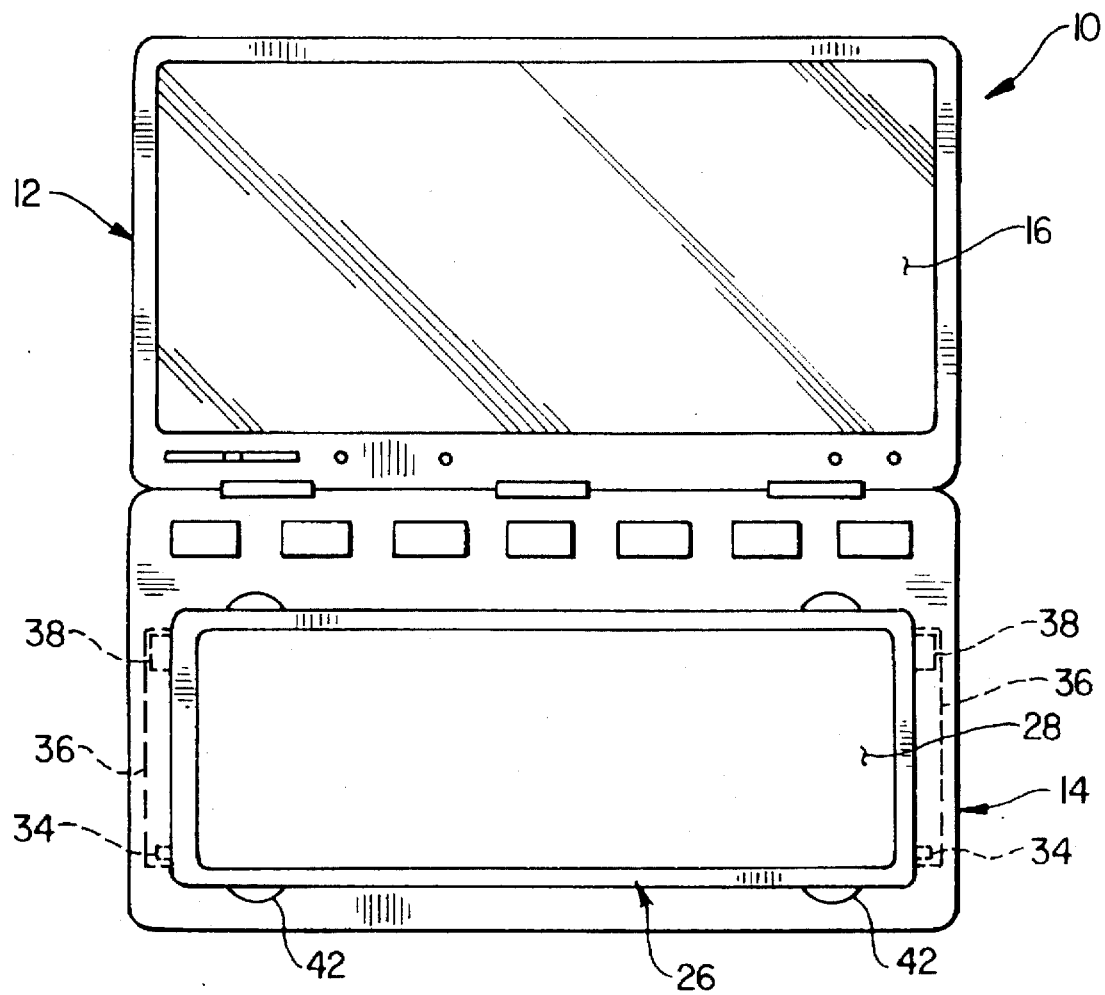
FIG. 3b is a view similar to that in FIG. 3a, but with the digitizer disposed in its operating position on the computer.

FIG. 3b shows the digitizer 28 in its operating position. Snap members 38 are engaged in rear end portions of slots 36, maintaining the reversible input device housing 26 in the recess 30. The computer operator now has a large surface area on which to draw, write, select screen objects, etc., without taking up any more space on the computer than is necessary for a keyboard.

Illustrated in FIG. 4 is a reversible input device 58 in another embodiment in keeping with the principles of the present invention. This embodiment is suited for use with a desktop computer, in which, typically, input devices are separate from the computer housing.

As an example of an input device that may be mounted on reversible input device 58, a conventional keyboard 60 is representatively illustrated with keys 62 for input of letters, numbers, symbols, and cursor control, and is mounted on a top surface of the device 58. Upwardly extending end members 64 have a height greater than that of the keys 62 so that when the device 58 is turned over, with the keyboard 60 on the bottom, it will rest on the end members 64 and not on the keys 62.

A connector 66 is provided generally in the center of the back side surface of the device 58 so that any cable attached to the connector 66 does not have to be transported from one side of the device 58 to the other when the device 58 is turned over. As with the previous embodiment, an infrared, radio frequency, or other communication method may be used instead of a cable and connector 66.

FIG. 5 shows device 58 turned over so that the keyboard 60 is on the bottom and the device 58 is supported by the end members 64. As an example of another input device that may be mounted on the bottom surface of reversible input device 58, a digitizer 68 is representatively illustrated in a position for use with a pen 70. In this embodiment, the sloped end members 64 provide an inclined orientation for the digitizer 68.

As discussed above with regard to the previous embodiment, an input device other than the digitizer 68, such as a scanner, may be utilized on the opposite side of the device 58 from the keyboard 60.

The foregoing detailed description is to be clearly understood as being given by way of illustration and example only, the spirit and scope of the present invention being limited solely by the appended claims.

What is claimed is:

1. A computer of the type having a screen, a housing, input storage means, and means for utilizing user-supplied input, wherein a user supplies input, whether in textual or graphical form, for communication to the computer, said computer comprising:

an input device housing having top and bottom side surfaces;

first input means mounted to said input device housing top side surface;

second input means mounted to said input device housing bottom side surface; and means for transmitting input from said first and second input means to the computer, said input device housing being selectively mountable to the computer housing in one of a first configuration wherein said input housing top side surface faces the screen, and a second configuration wherein said input housing bottom side surface faces the screen, whereby the user may selectively use either of said first or said second input means to send input to the computer.

2. The computer according to claim 1 further comprising a recess in the computer housing, said recess being cooperatively shaped to receive said input device housing therein with a selected one of said top and bottom side surfaces facing outwardly relative to said recess.

3. A computer of the type having a screen, a housing, input storage means, and means for utilizing user-supplied input, wherein a user supplies input, whether in textual or graphical form, for communication to the computer, said computer comprising:

an input device housing having top and bottom side surfaces;

first input means mounted to said input device housing top side surface;

second input means mounted to said input device housing bottom side surface;

means for transmitting input from said first and second input means to the computer;

a recess in the computer housing, said recess being cooperatively shaped to receive said input device housing therein with a selected one of said top and bottom side surfaces facing outwardly relative to said recess, and said recess including two parallel slots, one of said parallel slots being formed in each of two opposing, spaced apart side portions of said recess; and said input device housing further comprising two pins, one of said pins being formed on each of two opposite, spaced apart sides of said input device housing, each of said pins extending into, and being slidably and captively retained within, one of said slots, and two resilient snap members, one of said snap members being formed on each of said opposite, spaced apart sides of said input device housing, each of said snap members extending into, and being releasably retained within, one of said slots, whereby the user may selectively use either of said first or said second input means to send input to the computer.

4. The computer according to claim 1, wherein said first input means comprises a keyboard.

5. The computer according to claim 1, wherein said second input means comprises a digitizer.

6. The computer according to claim 1, wherein said means for transmitting input from said first and second input means to the computer comprises a flexible printed circuit.

7. The computer according to claim 1, wherein said input device housing further comprises opposite end portions and an enlarged support member mounted to each of said opposite end portions.

8. A computer of the type having a screen, a housing, input storage means, and means for utilizing user-supplied input, wherein a user supplies input, whether in textual or graphical form, for communication to the computer, said computer comprising:

a reversible input device housing having top and bottom side surfaces;

a first input device for translating a first form of input from the user to the computer, said first input device being mounted to said reversible input device housing top side surface;

a second input device for translating a second form of input from the user to the computer, said second input device being mounted to said input device housing bottom side surface; and means for reversing said reversible input device housing, said means for reversing said reversible input device housing comprising:

a recess in the computer housing, said recess being cooperatively shaped to receive said reversible input device housing therein with a selected one of said top and bottom side surfaces facing outwardly relative to said recess;

two parallel slots, one of said parallel slots being formed in each of two opposing, spaced apart end portions of said recess;

two pins, one of said pins being formed on each of two opposite, spaced apart ends of said reversible input device housing, each of said pins extending into, and being slidably, rotatably, and captively retained within, one of said slots; and two snap members, one of said snap members being formed on each of said opposite, spaced apart ends of said reversible input device housing, each of said snap members extending into, and being releasably retained within, one of said slots, whereby, by releasing said snap members from said slots, sliding said pins in said slots, and rotating said reversible input device housing about said pins, the user may selectively orient said top and bottom side surfaces so that a selected one of said first and second input devices faces outwardly relative to said recess, and whereby, by selectively orienting said reversible input device housing relative to the user, the user may selectively translate either of said first and said second types of input from the user to the computer.

9. Apparatus for communicating input to a computer by a user, said apparatus comprising:

an input device housing having opposite first and second side surfaces and first and second opposite ends, said input device housing being pivotably attachable to the computer at said first and second opposite ends, such that a selected one of said first and second side surfaces faces the user;

first input means disposed on said first side surface and operative to receive a first type of input from the user when said first side surface is oriented to face the user;

second input means disposed on said second side surface and operative to receive a second type of input from the user when said second side surface is oriented to face the user; and means for transmitting input received by said first and second input means to the computer, whereby, by selectively orienting said input device housing relative to the user, the user can conveniently transmit either of said first and second types of input to the computer.

10. The apparatus according to claim 9, wherein said first input means comprises a keyboard.

11. The apparatus according to claim 9, wherein said second input means comprises a digitizer.

12. The apparatus according to claim 9, wherein said means for transmitting input from said first and second input means to the computer comprises a flexible printed circuit.

13. The apparatus according to claim 9, wherein said input device housing further comprises opposite end portions and an enlarged support member mounted to each of said opposite end portions and operative to elevate said opposite first and second side surfaces relative to a horizontal support surface upon which said enlarged support members are rested.

14. A method of manufacturing a computer of the type having a screen, a housing, input storage means, and means for utilizing user-supplied input, wherein a user supplies input, whether in textual or graphical form, for communication to the computer, said method comprising the steps of:

providing an input device housing having top and bottom sides;

mounting first input means to said input device housing top side, said first input means being operative to receive a first type of input from the user;

mounting second input means to said input device housing bottom side, said second input means being operative to receive a second type of input from the user;

providing means for transmitting received user input from said first and second input means to the computer; and selectively mounting said input device housing to the computer housing in one of a first configuration wherein said input housing top side surface faces the screen, and a second configuration wherein said input housing bottom side surface faces the screen.

15. The method according to claim 14 further comprising the step of forming a recess in the computer housing, said recess being cooperatively shaped to receive said input device housing therein with a selected one of said top and bottom sides facing outwardly relative to said recess.

16. A method of manufacturing a computer of the type having a screen, a housing, input storage means, and means for utilizing user-supplied input, wherein a user supplies input, whether in textual or graphical form, for communication to the computer, said method comprising the steps of:

providing an input device housing having top and bottom sides;

mounting first input means to said input device housing to side, said first input means being operative to receive a first type of input from the user;

mounting second input means to said input device housing bottom side, said second input means being operative to receive a second type of input from the user;

providing means for transmitting received user input from said first and second input means to the computer; and forming a recess in the computer housing, said recess being cooperatively shaped to receive said input device housing therein with a selected one of said top and bottom sides facing outwardly relative to said recess, said recess forming step further including forming two parallel slots, one of said parallel slots being formed in each of two opposing, spaced apart side portions of said recess, and said input device housing providing step further comprising forming two pins, one of said pins being formed on each of two opposite, spaced apart sides of said input device housing, each of said pins extending into, and being slidably and captively retained within, one of said slots, and forming two resilient snap members, one of said snap members being formed on each of said opposite, spaced apart sides of said input device housing, each of said snap members extending into, and being releasably retained within, one of said slots.

17. The method according to claim 14, wherein said first input means mounting step comprises mounting a keyboard.

18. The method according to claim 14, wherein said second input means mounting step comprises mounting a digitizer.

19. The method according to claim 14, wherein said transmitting means providing step comprises providing a flexible printed circuit.

20. The method according to claim 14, wherein said input device housing providing step further comprises providing an input device housing having opposite end portions and an enlarged support member mounted to each of said opposite end portions.

* * * * *